March 8, 1960 R. R. POYNOR ET AL 2,927,649
DRAFT CONTROL APPARATUS
Filed Dec. 31, 1956 3 Sheets-Sheet 1
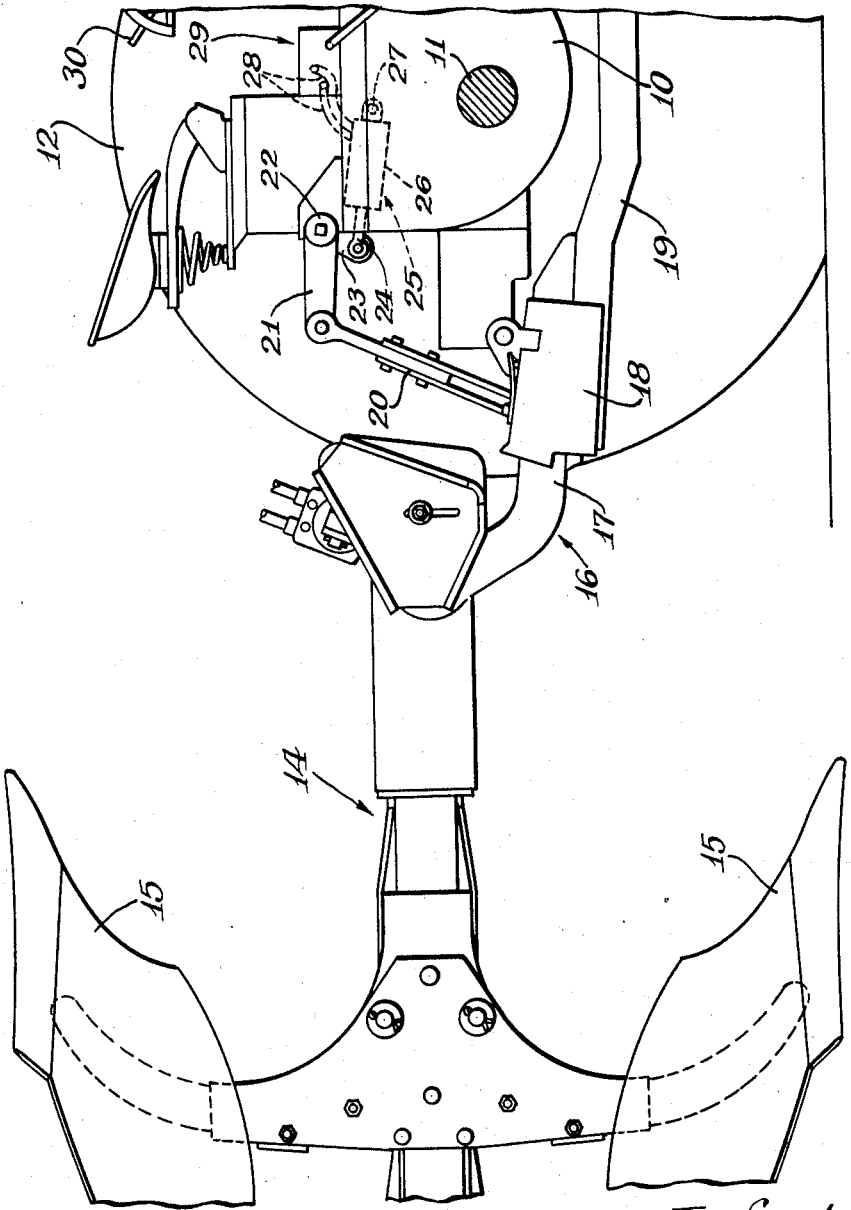
Inventors:
Russell R. Poynor
George Shute
Paul O. Pippel
Atty.

March 8, 1960  R. R. POYNOR ET AL  2,927,649
DRAFT CONTROL APPARATUS
Filed Dec. 31, 1956  3 Sheets-Sheet 2
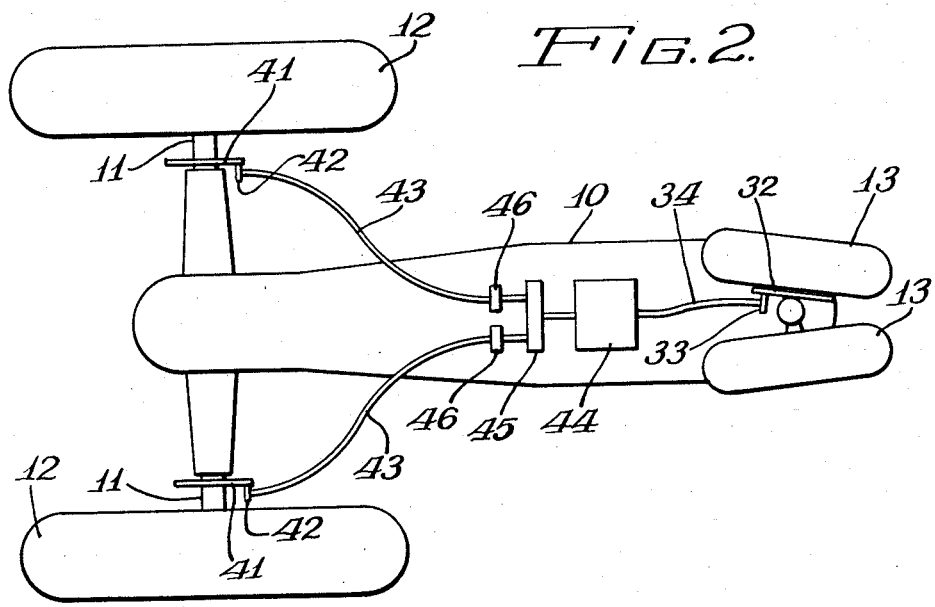
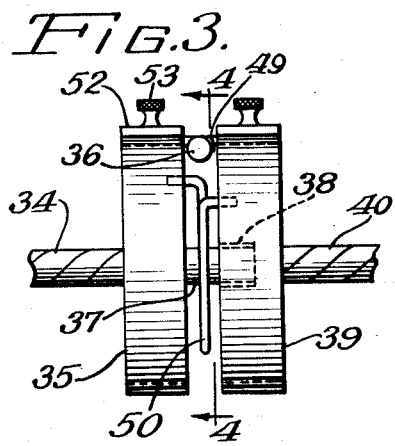
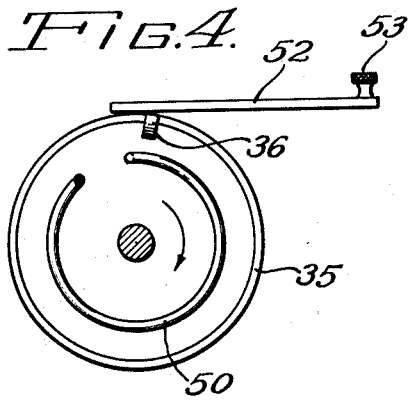
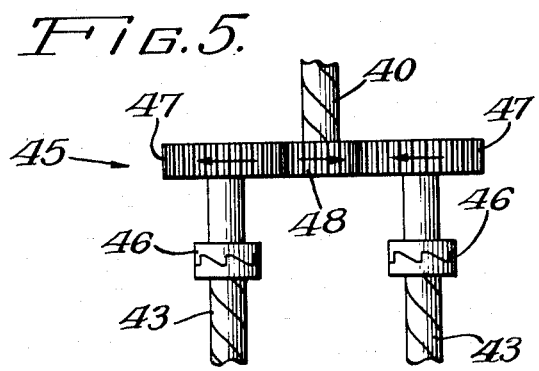
Inventors:
Russell R. Poynor
George Shute
Paul O. Pippel
Atty.

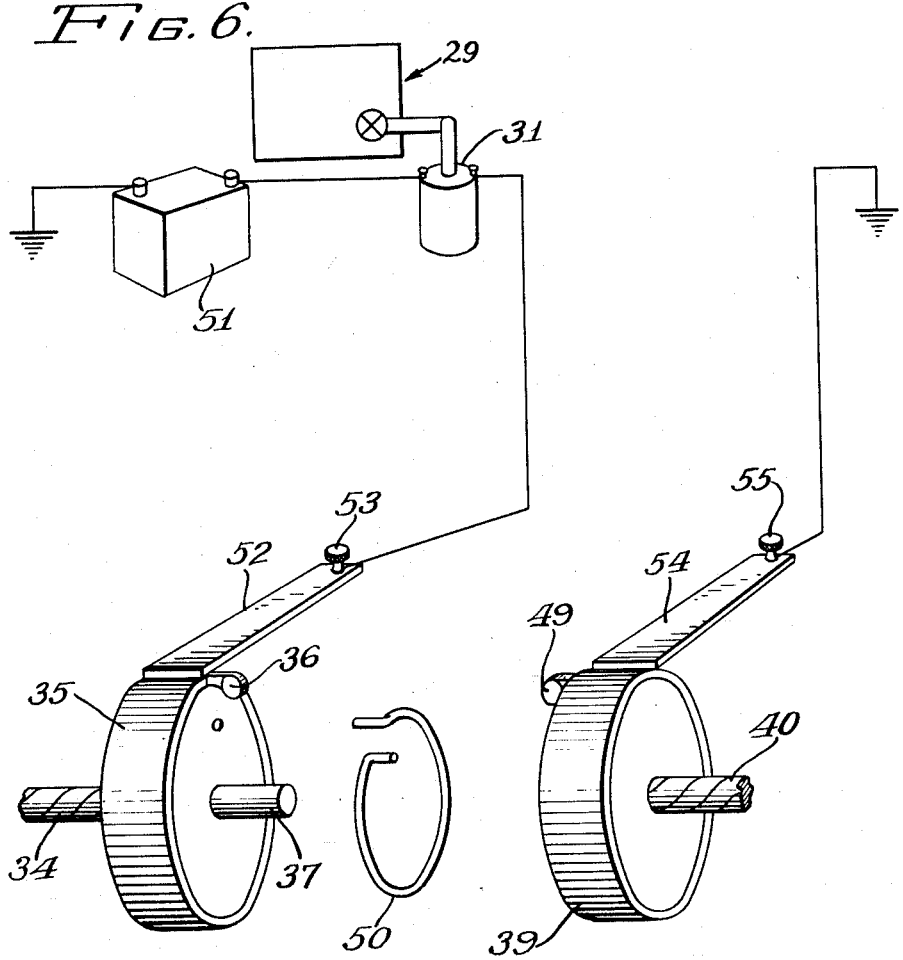

United States Patent Office 2,927,649
Patented Mar. 8, 1960

2,927,649

DRAFT CONTROL APPARATUS

Russell R. Poynor, Elmhurst, and George Shute, Naperville, Ill., assignors to International Harvester Company, a corporation of New Jersey Application December 31, 1956, Serial No. 631,846

3 Claims. (Cl. 172—2)

This invention relates to a system for regulating the traction of a power driven agricultural machine, and particularly to means for securing uniform drive wheel traction for a tractive vehicle under varying soil conditions when propelling an implement.

When an implement such as a plow is mounted on a tractor to be propelled thereby, an abnormal increase in draft load resulting from changes in the type of soil being traversed, and the like, causes the tractor drive wheels to slip, while what is needed is increased traction to pull the plow through the ground. This condition is common and a well-known method of offsetting this tendency of the drive wheels to slip is to apply weight to the tractor drive wheels sufficient to overcome slippage. One method of applying downward force on the drive wheels is to transfer some of the weight of the plow to the tractor. In the case of a rear mounted plow this is effected automatically by converting the increased draft load on the implement into lifting energy directed to the plow.

While the method described has been successful where loss of traction is due to increased draft load on the plow, it has been of little value where soil conditions in a field cause the tractor drive wheels to slip where no increase in load is encountered, for example, when the surface of the soil is wet and slippery.

The present invention contemplates a novel method of controlling the drive wheel traction of a tractor, or the like, under all soil conditions, and has for its object the provision of novel means for transferring the weight of an implement to the tractor when slippage of the drive wheels occurs for any reason.

The invention has for another of its objects the provision of a novel sensing and control system on a tractor for detecting drive wheel slippage and for actuating the lifting mechanism on the tractor to transfer to the latter some of the weight of the implement propelled thereby, and contemplates the provision of means for capitalizing on the change in forward motion or ground speed of the tractor due to slippage of the drive wheels, to actuate the implement lifting mechanism of the tractor.

Another object of the invention is the provision of connecting means extending between the tractor drive wheels and a ground driven wheel such as the tractor front wheels where slippage is at a minimum, said connecting means including means utilizing the differential in rotary speed of said wheels for actuating the lifting means of the tractor.

When the tractor drive wheels slip their rotary speed is increased, while the ground speed of the tractor and the rotary speed of the front wheels is decreased. Therefore, a further object of the invention is the provision of traction control means including an electrical switch in the connection between the tractor front and rear wheels which is normally open but is closed by the reduction in ground speed of the front wheels and the increase in speed of the drive wheels, whereby an impulse is transmitted to an actuating means for the power lift mechanism of the tractor.

Other objects and advantages of the invention will become clear from the following detailed description when read in conjunction with the accompanying drawings wherein:

Figure 1 is a view in side elevation of the rear end of a tractor having one wheel removed, wherein are incorporated the features of this invention, and showing mounted thereon for vertical movement between operating and transport positions, an implement in the form of a two-way moldboard plow;

Figure 2 is a diagrammatic plan view of the tractor and the traction control apparatus of this invention looking at the tractor from below;

Figure 3 is an enlarged diagrammatic detail of the actuating mechanism of the sensing unit by which the power lift operating means is actuated to transmit a lifting force to the implement;

Figure 4 is a section taken on the line 4—4 of Figure 3;

Figure 5 shows a detail of the drive means extending between the drive wheels and the sensing apparatus; and Figure 6 is a diagrammatic representation of the electrical circuit connecting the sensing and actuating apparatus to the power lift control means.

Referring to the drawings, the numeral 10 designates the longitudinally extending body of a tractor of the tricycle type having transverse rear axles 11, laterally spaced drive wheels 12 and ground driven dirigible front wheels 13.

The implement selected for the purpose of illustration is a two-way roll-over moldboard plow comprising a frame 14, plow bottoms 15 and a hitch structure 16. Hitch structure 16 includes a pair of laterally spaced longitudinally extending shaft members 17, only one of which is shown, affixed to the frame 14 and projecting forwardly therefrom for reception in complementary longitudinally elongated socket members 18, only one of which is shown, affixed to the rear end of a vertically swingable tractor drawbar 19 pivotally connected by depending lifting links 20 to lift arms 21 secured to a transversely extending rockshaft 22. Shaft 22 is rocked to vertically swing the lift arms 21 to raise and lower the implement by means including another arm 23 affixed to shaft 22 and pivotally connected to the piston rod 24 of a hydraulic ram unit 25 comprising a cylinder 26 which slidably receives piston rod 24 and is anchored at 27 to the tractor.

Fluid under pressure is supplied to the ram unit 25 through hose lines 28 from a hydraulic pump and valve control apparatus indicated at 29 which is operated manually by the tractor operator by manipulating a control lever 30 or automatically by the actuation of a solenoid diagrammatically represented at 31 in Figure 6, to direct fluid from pump and valve unit 29 to the hydraulic ram 25 to operate the latter. It may be understood that when the implement 14 is in normal operation in the ground it floats freely and adds substantially no weight to the tractor.

With particular reference to Figure 2 it will be noted that one of the front wheels 13 of the tractor has mounted thereon coaxially therewith a rotary ring or wheel member 32 engaged by an adjustable friction wheel 33 mounted on the end of a flexible cable 34 having secured to its other end an annular rotary member or ring 35 having an electrically conductive contact member or point 36 secured thereto and projecting therefrom.

An extension 37 of flexible drive shaft 34 projects into a socket 38 in another rotary member 39 coaxial with member 35 and secured to the end of a flexible cable 40. Rotary member 39 and flexible shaft 40 are driven from the tractor drive wheels 12 by means of a pair of drive rings or the like 41, one being mounted on each axle and connected by a friction wheel 42 to a pair of flexible drive shafts 43.

The rotary members 35 and 39, shown in Figure 3, constitute a part of the sensing unit indicated at 44 in Figure 2. This is the unit that, in response to slippage of the drive wheels 12, actuates the means controlling the flow of fluid to the hydraulic ram 25 in a direction to raise the implement and transfer the weight thereof back to the tractor drive wheels. Since one tractor drive wheel may slip more than the other, it is necessary to pass on to the sensing unit whichever drive wheel motion is the greater. This is accomplished by means of a differential drive selector assembly such as that indicated in Figure 5 by the numeral 45 which also may function as a ratio corrector to compensate for the difference in ratio between the tractor drive wheel diameters with respect to diameters of the drive rings 41, compared to the diameter of ground wheel 13 with respect to the diameter of ring or wheel 32. To permit one drive shaft 43 to rotate faster than the other, a one-way or slip clutch 46 is incorporated in each shaft, and upon the end of each shaft is mounted a gear 47 which meshes with another gear 48 mounted on the end of flexible shaft 40. The rotary speed of ring member 35 is thus determined by the rotary speed of the front wheels 13 of the tractor, and the rotary speed of ring member 39 is determined by the rotary speed of the tractor drive wheels 12.

As pointed out before, rotary member 35 is provided with a switch point 36 secured thereto adjacent the periphery thereof and extending between the two members 35 and 39. As will be observed in Figure 6, rotary member 39 is likewise provided with a switch point 49. The rotary members 35 and 39 are the actuating means which transmit to the power lift means through solenoid 31 the signal received from the tractor front and rear wheels. These parts are shown in an exploded view in Figure 6, while they are brought together in operating relation in Figure 3.

The periphery or rotary speed of the dirigible front wheels 13 of the tractor is somewhat higher than the rotary speed of the tractor drive wheels 12 under normal operating conditions to compensate for a normal amount of drive wheel slippage. Under these conditions, therefore, with the members 35 and 39 rotating in the same direction, member 35 rotates somewhat ahead of member 39 and switch point 49 maintains a separate relationship spaced from switch point 36. The excess rotation of shaft 34 due to the somewhat higher speed of wheel 13 is carried through to the slip clutches 46 so that no strain is placed on the apparatus. The relationship between wheels 35 and 39 is maintained substantially constant by the provision of a coil spring 50 having one end thereof bent for reception in a suitable opening provided in the member 35, and the other end of the spring being bent for reception in a suitable opening provided in the member 39. When slippage of the drive wheels occurs the rotary speed thereof increases beyond that of the front wheels 13 and rotary member 39 turns at a higher speed than member 35 so that the switch points 36 and 49 come into engagement against the bias of spring 50. The compensation in ground wheels 13 for the amount of allowable slippage of the drive wheels can be adjusted by shifting, in any suitable manner, friction wheel 33 along the radius of wheel 32, thereby changing the effective diameter of the wheel or ring 33.

Electrical energy is transmitted to the switch points 36 and 49 from a battery or other source of current 51 which is connected to a contact finger 52 having a terminal 53 thereon and engageable with the periphery of rotary member 35. Another contact finger 54 engages the periphery of member 39 and is provided with a terminal 55 from which an electrical connection leads to a suitable ground.

The points 36 and 49 represent a switch which is closed upon engagement of these points in response to the increased rotary speed of the tractor drive wheels, and the closure of the switch serves to actuate the solenoid indicated at 31 in Figure 6 in the circuit between the battery 51 and member 35.

The solenoid 31 controls the traction of the drive wheels 12 of the tractor by operating the pump and valve unit 29 on the tractor from which fluid under pressure is supplied to the hydraulic ram 25 to operate the rockshaft 22, lift arms 21 and links 20 to lift the drawbar 19 and the implement 14. Solenoids are well known as electrically actuated means for controlling valves and the like, and the particular construction thereof and of the valve mechanism controlling the hydraulic ram form no part of this invention. An instance of such a solenoid operated valve controlling a brake cylinder, for example, may be found in the United States patent to R. L. Wilson 2,232,750. Furthermore, the mechanism of the sensing unit 44, the differential drive selector 45 etc. may take different forms. However, it should be understood that such modifications in the construction and arrangement of parts as may be made do not necessarily depart from the spirit of the invention or the scope of the appended claims.

What is claimed is:

1. The combination with a tractor having drive wheels and an implement connected thereto, power lift means thereon connected to the implement for raising and lowering the latter, and a source of electric current of traction control means on the tractor including electric operating means having a connection to said source of current, means operatively connecting said electric operating means to said power lift means to operate the latter to lift the implement upon actuation of said control means, drivable actuating means on the tractor, a ground wheel rotatable by movement of the tractor over the ground, means forming a driving connection between said ground wheel and said actuating means, separate means forming a driving connection between the tractor drive wheels and said actuating means, and an operating connection between said actuating means and said control means comprising a first rotary member operatively connected to said ground wheel for rotation thereby, a second rotary member adjacent said first rotary member operatively connected to said drive wheels for rotation thereby, the rotary speed of said ground wheel being greater under normal operating conditions than that of the drive wheels to compensate for normal drive wheel slippage, and a switch part on each of said rotary members, the switch part on said first rotary member being ahead of and normally out of contact with the switch part on said second rotary member, the switch part on said second rotary member being adapted to overtake and engage the switch part on said first rotary member to energize said electric operating means when the rotary speed of said second rotary member increases due to increase in rotary speed of said drive wheels.

2. The combination with a tractor having power driven drive wheels and a ground wheel rotatable by the propulsion of the tractor over the ground, of an implement connected to the tractor in draft-receiving relation, power lift means on the tractor connected to the implement for raising and lowering the latter, a first rotary member mounted on the tractor, means operatively connecting the tractor drive wheels to said rotary member to rotate the latter in response to rotation of the drive wheels, a second rotary member associated with said first rotary member, means operatively connecting said ground wheel to said second rotary member to rotate the latter in response to rotation of said ground wheel, the rotary speed of said second rotary member being normally higher than that of said first rotary member and the rotary speed of said first rotary member being higher than that of said second rotary member when abnormal draft conditions are encountered by the implement, means responsive to a predetermined variation in speed of rotation of said rotary members and operatively connected to said power lift means for actuating the latter, comprising a source of electrical current, means operatively connecting said first and second rotary members to said source, said members having electrical contact points thereon movable into engagement when said first rotary member is revolved at a higher rate of speed than said second rotary member, and an electrical connection between said rotary members and said power lift means for actuating the latter when said electrical contact points are in engagement.

3. The combination with a tractor having power driven drive wheels and a ground wheel rotatable by the propulsion of the tractor over the ground, of an implement connected to the tractor in draft-receiving relation, power lift means on the tractor connected to the implement for raising and lowering the latter, a first rotary member mounted on the tractor, means operatively connecting the tractor drive wheels to said rotary member to rotate the latter in response to rotation of the drive wheels including a pair of drive shafts, one for each drive wheel, a slip clutch incorporated in each said shaft to compensate for rotary speed differential between said drive wheels, a second rotary member associated with said first rotary member, means operatively connecting said ground wheel to said second rotary member to rotate the latter in response to rotation of said ground wheel, and means responsive to a predetermined variation in speed of rotation of said rotary members and operatively connected to said power lift means for actuating the latter.

References Cited in the file of this patent
UNITED STATES PATENTS

| | | |
|---|---|---|
| 1,761,708 | Cook et al. | June 3, 1930 |
| 1,922,829 | Tengstrom | Aug. 15, 1933 |
| 2,232,750 | Wilson | Feb. 25, 1941 |
| 2,381,225 | Newell | Aug. 7, 1945 |
| 2,654,301 | Bohmker | Oct. 6, 1953 |
| 2,779,604 | Voegeli | Jan. 29, 1957 |

FOREIGN PATENTS

| | | |
|---|---|---|
| 668,250 | Great Britain | of 1952 |